United States Patent
Mo et al.

(10) Patent No.: US 9,687,779 B2
(45) Date of Patent: Jun. 27, 2017

(54) CONTROL OF CARBONYL SULFIDE WITH SODIUM BOROHYDRIDE IN CAUSTIC TOWERS FOR PETROLEUM/PETROCHEMICAL PROCESSES

(71) Applicant: BAKER HUGHES INCORPORATED, Houston, TX (US)

(72) Inventors: Hua Mo, Friendswood, TX (US); Roger D. Metzler, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 17 days.

(21) Appl. No.: 14/813,333

(22) Filed: Jul. 30, 2015

(65) Prior Publication Data

US 2017/0028346 A1 Feb. 2, 2017

(51) Int. Cl.
| | | |
|---|---|---|
| *C10G 29/00* | (2006.01) | |
| *C10G 29/02* | (2006.01) | |
| *C10G 29/06* | (2006.01) | |
| *C10G 29/08* | (2006.01) | |
| *B01D 53/48* | (2006.01) | |
| *B01D 53/78* | (2006.01) | |

(52) U.S. Cl.
CPC .......... *B01D 53/485* (2013.01); *B01D 53/78* (2013.01); *B01D 2251/108* (2013.01); *B01D 2251/304* (2013.01); *B01D 2257/308* (2013.01)

(58) Field of Classification Search
CPC ........ C10G 29/00; C10G 29/02; C10G 29/06; C10G 29/08; B01D 53/48; B01D 53/485
See application file for complete search history.

(56) References Cited

U.S. PATENT DOCUMENTS

| | | | | |
|---|---|---|---|---|
| 1,787,570 A | * | 1/1931 | Dubbs | B62B 1/18 208/227 |
| 2,060,091 A | * | 11/1936 | Lyman | C10G 17/095 208/245 |
| 2,315,663 A | * | 4/1943 | Ruoho | C10G 29/06 208/230 |
| 3,265,757 A | * | 8/1966 | Frevel | B01J 23/04 585/852 |
| 3,507,613 A | * | 4/1970 | Buningh | C10G 19/00 208/230 |
| 4,786,405 A | * | 11/1988 | Kutty | C10G 19/00 208/220 |
| 5,582,808 A | | 12/1996 | Patek | |
| 6,284,019 B1 | | 9/2001 | Sorensen et al. | |
| 8,992,769 B2 | * | 3/2015 | O'Rear | C10G 29/205 208/251 R |
| 2008/0245233 A1 | | 10/2008 | Gu et al. | |

FOREIGN PATENT DOCUMENTS

| | | | |
|---|---|---|---|
| EP | 0612705 A1 | 8/1994 | |
| GB | 1096015 A | * 12/1967 | C01B 17/06 |

OTHER PUBLICATIONS

Wartik, T., et al., "Reactions of Carbon Dioxide With Sodium and Lithium Borohydrides," J. Inorg. Nucl. Chem., vol. 7, pp. 404-411 (1958) at the link http://www.sciencedirect.com/science/article/pii/002219025880250X.

* cited by examiner

*Primary Examiner* — Timothy Vanoy
(74) *Attorney, Agent, or Firm* — Mossman Kumar & Tyler, P.C.

(57) ABSTRACT

Sodium borohydride ($NaBH_4$) may be used to removing carbonyl sulfide (COS) from a process stream containing it. The method involves contacting the process stream with an amount of effective of $NaBH_4$ to react with the COS to form reaction products that may be removed by a process of washing away the reaction product by an aqueous basic compound and/or the reaction product having a higher boiling point than carbonyl sulfide which permits trapping the reaction product, such as in a caustic tower.

13 Claims, No Drawings

CONTROL OF CARBONYL SULFIDE WITH SODIUM BOROHYDRIDE IN CAUSTIC TOWERS FOR PETROLEUM/PETROCHEMICAL PROCESSES

TECHNICAL FIELD

The present invention relates to the removal of carbonyl sulfide (COS) from a process stream, and more particularly relates, in one non-limiting embodiment, to methods for removing COS from caustic towers.

TECHNICAL BACKGROUND

Gas scrubbers are devices used for separating components of a gas admixture. In some embodiments, these devices are used to "purify" gasses or, stated in the alternative, remove undesirable components from a gas stream. For example, primitive scrubbers have been used since the inception of submarine warfare to remove carbon dioxide from the air supply in the submarine.

More recently, gas scrubbers have proven to be essential in many industries. For example, gas scrubbers are used to prevent pollution from the burning of coal during power generation. Gas scrubbers are also used to remove undesired components from crude oil during refining and to remove undesirable components from process gas streams during the production of chemicals, metals and devices such as semiconductors and the like. More specifically, caustic scrubbers use aqueous caustic, i.e. sodium hydroxide (NaOH) and/or potassium hydroxide (KOH) to "scrub" or react with hydrogen sulfide ($H_2S$) to remove it to form NaHS (aqueous) and water (liquid), which consumes the caustic.

Carbonyl sulfide (COS) is produced by furnaces in petroleum and/or petrochemical processes. The presence of COS will not only cause fouling in the caustic system, but will also cause an undesirable side effect on the downstream side of the caustic tower. The side effect may or may not be limited to poisoning the hydrogenation catalyst, thus increasing the sulfur number of subsequently produced pyrolysis gasoline (pygas), a naphtha-range product with a high aromatics content. The current method to remove COS is to use an absorbent, including, but not necessarily limited to molecular sieves, copper oxide, zinc oxide, aluminum oxide, activated alumina, and combinations of these.

U.S. Pat. No. 5,582,808 discloses providing borohydrides that are useful in reducing aldol condensation and subsequent polymer formation in caustic scrubbers. The borohydrides are believed to react with reactive carbonyls yielding more stable alcohols and a salt of the borohydride which remains water soluble, and thus is unlikely to be carried out with the hydrocarbon phase. The borohydrides of the '808 patent have the potential to reduce reactive carbonyls at a molar ratio as high as about 4:1::carbonyl:borohydride. A preferred borohydride is sodium borohydride (sodium tetrahydroborate).

It would be desirable to remove COS from process streams using an alternative process.

SUMMARY

There is provided in one non-limiting embodiment a method for removing carbonyl sulfide (COS) from a process stream containing it, where the method includes contacting the process stream with an amount of sodium borohydride ($NaBH_4$) effective to react with the COS to form at least one reaction product, which reaction product may be removed by a process of either (1) washing away the at least one reaction product with a basic compound and/or (2) trapping the at least one reaction product, where the at least one reaction product has a higher boiling point than carbonyl sulfide.

In an alternative non-restrictive version there is provided a method for removing COS from a process stream containing it, where the process stream is present in a caustic tower of a petroleum or petrochemical process, where the method includes contacting the process stream with an amount of $NaBH_4$ ranging from a molar ratio of $NaBH_4$ to COS of from about 0.02:1 to about 50:1 based on the amount of COS to react with the COS to form at least one reaction product that may be removed by a process of (1) washing away the at least one reaction product with a basic compound of NaOH and/or KOH, and/or (2) trapping the at least one reaction product in the caustic tower, where the at least one reaction product has a higher boiling point than COS.

DETAILED DESCRIPTION

One non-limiting embodiment of the discovery herein includes a method for the prevention or mitigation of fouling in a basic washing system and/or removing COS from the system. The most common basic washing systems are caustic scrubbers. For the purposes of the present application, a caustic scrubber is device for removing water soluble and/or acidic or other base reactive components from a fluid stream, often a gas. Also for the purposes of the present application, the term "caustic" is defined broadly to mean a strong base (alkaline) substance including, but not limited to sodium hydroxide (NaOH), potassium hydroxide (KOH), and lithium hydroxide (LiOH); but also specifically including any compound now known or later discovered to be useful for extracting a water soluble and/or acidic component or other base-reactive component from a fluid stream in a fluid scrubber. For example, in one non-restrictive version the basic washing systems useful herein may include an organic amine or a solution including an organic amine as a liquid scrubbing material. However, in another non-limiting embodiment "caustic" is defined as selected from the group consisting of sodium hydroxide, potassium hydroxide, lithium hydroxide, and combinations thereof. It will be appreciated that the fact that a liquid washing phase, which in one non-limiting embodiment is a caustic liquid, does not encompass all liquids that are basic which contain relatively small amounts of an alkali metal hydroxide or alkanolamine, alkyl amine, and/or alkazides to adjust the pH of the liquid. In the caustic liquids used herein, the caustic or basic materials, in the case where alkali metal hydroxide is used in the basic system, the amount of alkali metal hydroxide may be about 20 wt % or less; alternatively about 15 wt % or less; and in another non-limiting embodiment, about 12 wt % or less. In the case where the basic washing system uses amines (alkanolamine, alkyl amine, and/or alkazides), the amount of amine may comprise about 50 wt % independently to about 60 wt % of the liquid, alternatively from about 52 independently to about 58 wt % of the liquid. The basic washing system and/or the liquid washing phase composition may have a pH of 9 or greater; alternatively 9.5 or greater, and in a different non-limiting embodiment of 10 or greater. These liquids are aqueous.

Caustic towers are used to absorb acid gases and typically use a sodium hydroxide (NaOH) solution. Calcium hydroxide (CaOH) and magnesium hydroxide (MgOH) cannot be used in a caustic tower because the solubility of CaOH and MgOH in water is too low to be useful. An amine unit in a refinery can also be used to absorb acid gas, just like a caustic tower. Therefore in one non-limiting embodiment, the methods described herein may also be used in an amine unit, as they can be used in a caustic tower.

Conventional gas scrubbers include a "tower" which is, in essence, a pipe or column, typically including trays or occasionally an inert packing, where a gas stream is contacted with a liquid scrubbing material. In the case of at least one embodiment of the methods and compositions described herein, the liquid scrubbing material is a caustic liquid as defined herein. In some applications, the liquid scrubbing material is passed down through an upward moving gas stream with a packing material serving to increase the mixing of the gas and liquid scrubbing material. In an alternative embodiment, the direction of the gas and fluid passing through the tower may be reversed from that noted in the first embodiment. In still another embodiment, the gas stream and the caustic fluid of the method of the application may move in the same direction.

There are many types of gas scrubbers which are included within the meaning of the term caustic scrubber that are known to be useful. For example, U.S. Pat. No. 6,284,019 to Sorensen, et al., which is incorporated herein by reference in its entirety, discloses a scrubber for removing pollutants from a gas comprising a housing for conducting the gas therethrough, a mechanism for introducing pollutant-reactive filtering agent into the housing, a sump for collecting the filtering agent and having a first volume, and an intermediate sump for collecting the filtering agent and channeling the filtering agent into the sump, the intermediate sump having a second volume that is less than the first volume. Rather than having a tower, this patent discloses the use of a "chamber" which serves the same function as a tower and, for the purposes of the methods and compositions described herein shall be designated as such.

A variety of scrubbers are commercially available. For example, the TRI-MER Corporation markets a variety of scrubbers for use in industry. Exemplary are the so-called "cross flow" scrubbers, which come in a variety of configurations. Common to most commercial scrubbers is a "sump" and/or storage tank for scrubbing liquids. These sumps and/or storage tanks may be internal or external to the scrubber cabinets. Any gas scrubber which utilizes a caustic liquid in order to scrub a gas and is known to be useful to those of ordinary skill in the art of using gas scrubbers may be used with embodiments of the method of the disclosure.

With caustic scrubbers, the caustic liquid in the scrubber is sometimes consumed with use, especially when the liquid scrubbing material is an inorganic base such as sodium hydroxide. As a consequence, in such embodiments, the liquid scrubbing material may be renewed either continuously or intermittently. Ideally, it would be desirable in the art that the caustic liquid scrubbing material be renewed only as it is consumed, that is as a consequence of the loss of alkalinity due to reaction of the caustic liquid scrubbing material with acidic, or base-reactive compounds in the fluid being scrubbed. Unfortunately, the scrubber may require a more frequent renewal of the caustic fluid, if not an actual shut down and clean out, due to the phenomena of fouling.

While caustic scrubbers are a very common embodiment of basic washing systems, there are other types of basic washing systems in use. Other examples of basic washing systems include scrubbers that use alkanolamines, (such as methyl ethylamine (MEA), diethyl amine (DEA), methyl diethylamine (MDEA), and amine diisopropanol (ADIP)), hindered amines, and alkazide as the liquid washing materials. Still other types of basic washing systems include water wash columns such as those used to refine crude butadiene in butadiene manufacturing plants. Some washing systems are liquid/liquid washing systems where both the washing materials and the stream being washed are liquids and at least some embodiments of the methods and compositions described herein may be used with these applications as well.

For the purposes of the disclosure, fouling, in relation to a basic washing system, occurs when chemical reactions occur in the caustic liquid scrubbing material resulting in solids (or sludges) and/or substantial increases in the viscosity of the caustic liquid scrubbing material. As defined herein, "fouling" is the clogging, blocking, choking or otherwise obstruction of the basic washing system with solids formed by aldol condensation to the point that flow is prevented or inhibited to a problematic extent, meaning preventing the basic washing system from operating in the way in which it was intended. In one non-limiting embodiment, "fouling" includes an absence of consumption of a chelating agent or chelant. In another non-limiting embodiment, the methods and compositions herein may have an absence of an aminopolycarboxylic acid chelating agent and/or an absence of a chelated polyvalent metal catalyst.

While not wishing to be bound by any theory, it is nevertheless believed that when fluids including unsaturated compounds are washed; at least some fouling is the result of aldol polymerizations. In an aldol polymerization, often referred to in the art as an aldol condensation, two molecules, each one having an aldehyde or ketone group react to form a single molecule having a hydroxyl and a carbonyl group. Non-restrictive embodiments of the methods described herein are particularly useful for scrubbing gas streams having components that may undergo an aldol condensation. For example, in one embodiment, the method of the disclosure is used to wash gas including ethylene using a caustic scrubber. However, the amount of sodium borohydride used in the method described herein should be insufficient to interfere with the caustic scrubbing.

Refineries and chemical plants are among those industries most likely to have fluid streams and especially gas streams which include either acidic or base-reacting gases, or both, that are undesirable and also include aldehyde and/or ketones. Embodiments of the method of the application may be useful in applications where, except for causing fouling, the aldehyde and/or ketone component of a fluid stream is not otherwise undesirable. Embodiments of the methods described herein are also useful in applications where it is desirable to remove an aldehyde or ketone component of a gas stream.

In one other non-limiting embodiment, it is noted that failure to scrub or adequately scrub a gas stream that has a tendency to foul scrubbers is often undesirable in industry. Fouling in scrubbers can be the cause of increased maintenance costs and lost productivity where products are either made at a slower rate because of poor scrubber efficiency or the products produced are out of specification. As an example of the latter, consider a gas stream which may have a $CO_2$ and/or $H_2S$ specification. Failure to meet the specification may require that the product gas be sent through a second scrubber or refused by a customer. Either of these can cause production costs to rise with a consequential loss of profits.

Scrubber failures due to fouling may also have safety and environmental consequences. While fouling may be most noticeable in the tower of a scrubber, it may also occur in the sump, holding tank, and in any other pipe, vessel, or other portion of a scrubber where caustic liquid scrubbing material has sufficient residence time to allow for the dropping of suspended solids or the forming of a film or coating onto the walls of the exposed portions of the scrubber.

In some embodiments of the methods herein, a process stream, such as that in a scrubber, is treated with an additive. It has been particularly discovered that carbonyl sulfide (COS) can be removed from process streams, such as those in caustic towers, by the addition of sodium borohydride ($NaBH_4$) as the additive. When COS gas is present in a solution of $NaBH_4$, the COS will react with the $NaBH_4$ and the reaction is irreversible. The reaction can be illustrated as follows:

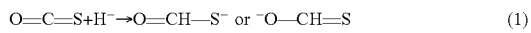  (1)

The reaction products are (a) are a more polar species, that is a more water-soluble species and can be washed away by the aqueous caustic, and/or (b) a product species having a boiling point of the higher than COS and which will thus be trapped in the caustic tower.

As noted, the petroleum and petrochemical processes where this method may be used include, but are not necessarily limited to, $H_2S$ scrubbing processes, olefins steam cracking processes, and the like. It will be appreciated that because the method is practiced in a caustic tower, the conditions of reaction are basic, that is, greater than 7 pH, but alternatively in the pH ranges previously mentioned for basic washing systems and/or the liquid washing phase compositions.

The effective amount of sodium borohydride added is any amount that is effective to bind up COS and at least partially convert it to a reaction product that can be removed, including but not necessarily limited to, $O=CH-S^-$ and $^-O-CH=S$. In another non-limiting embodiment, the effective amount of $NaBH_4$ is a molar ratio of $NaBH_4$ to COS of from about 0.02:1 independently to about 50:1 based on the amount of carbonyl sulfide present in the process stream; alternatively, the molar ratio ranges from about 0.1:1 independently to about 40:1. The word "independently" as used with respect to a range herein means that any lower threshold may be used with any upper threshold to provide a suitable alternative range. The theoretical amount is a 1:1 mole ratio of $NaBH_4$ to COS, as shown in reaction (1). In one non-limiting embodiment the amount of $NaBH_4$ to COS is in excess of a mole ratio of 1:1.

While laboratory data are not available, it was discovered that when $NaBH_4$ was introduced into a caustic tower to remove carbonyl-containing species that the COS amount in downstream process stream was significantly decreased.

The additives described herein are desirably fed to basic washing systems such as scrubbers at an effective concentration. Those of ordinary skill in the art of running such units are well versed in determining the effective concentration of additives to use in their equipment. Such concentrations are dictated, in the case of gas scrubbers for example, by the operational conditions of the scrubbers including the makeup of the gas stream, feed rates, and operating temperatures. Generally, the additives will be present at a level in the caustic solutions in the scrubbers such that the concentration of COS in the process stream, whether or not in a mixture, is lowered to from about 1 independently to about 5 ppm. In other embodiments the concentration is from about 0.1 independently to about 100 ppm.

The $NaBH_4$ additive may be desirably added to a liquid feed stream into a basic washing system such as, for example, a caustic scrubber. The $NaBH_4$ additive may be added directly to the caustic scrubber or aspirated into a gas feed stream. The additives may also be introduced into a basic washing system using any other method known to be useful for introducing an additive to a scrubber.

In addition to the additives already described, the additives used herein may include other compounds known to be useful in basic washing systems such as dispersants, defoamers, and the like. Any compound that does not have an undesirable interaction with the additive's ability to reduce or remove COS and/or prevent fouling may be used with at least some embodiment of the methods and compositions described herein.

It will be appreciated that, as mentioned, a caustic tower is used to remove acid gas in the cracked gas. It is a caustic (e.g. NaOH) scrubber. The reaction is mainly an acid-base reaction. The carbonyl component, such as an aldehyde, is also condensed in the caustic tower. The carbonyl could form the polymers which foul the caustic tower under caustic conditions. Therefore sodium borohydride is used to convert aldehyde to the alcohol to mitigate the fouling. The purpose of the sodium borohydride in U.S. Pat. No. 5,582,808 is used as an aldol condensation inhibitor.

The present new method is different from that of the '808 patent. COS does not belong to the organic carbonyl. That is, it is more similar chemically to $CO_2$. The presence of COS will cause issues in the downstream process, for instance, poisoning hydrogenation catalysts. The present method traps COS in the caustic tower by reacting the COS with sodium borohydride. The presence of sodium borohydride would thus help remove the COS impurity in the cracked gas.

The following examples are provided to illustrate the present method. The examples are not intended to limit the scope of the present method and they should not be so interpreted. Amounts are in weight parts or weight percentages unless otherwise indicated.

Example 1

When a potential customer used sodium borohydride to remove carbonyl in a caustic tower, it was discovered that the COS concentration in the downstream side also decreased. The inventors then conducted a series of experiments to prove the concept. Because it is difficult to obtain COS or to produce it in a laboratory, sodium borohydride was reacted with carbon dioxide ($CO_2$) and carbon disulfide ($CS_2$). The molecular structure of COS is intermediate in structure between $CO_2$ and $CS_2$. Therefore, by analogy sodium borohydride would react with COS by either attacking the carbonyl or the $C=S$ bond. Literature that indicates sodium borohydride reacts with $CO_2$ includes that found in the article T. Wartik, et al., "Reactions of Carbon Dioxide with Sodium and Lithium Borohydrides," *J. Inorg. Nucl. Chem.*, Vol. 7, pp. 404-411, 1958 at the link: http://www-.sciencedirect.com/science/article/pii/002219025880250X.

It was found that after mixing 10 mL of sodium borohydride with 0.1 mL $CS_2$ that $CS_2$ was not detected with gas chromatography/mass spectrometry (GC/MS) after heating at 60° C. for three hours in a sealed and strong stirring in a glass vial. In the blank of 9 mL water with 0.1 mL $CS_2$, the presence of $CS_2$ was still found. From these results it may be concluded that $CS_2$ was trapped in the sodium borohydride solution by chemical reactions.

In the foregoing specification, the invention has been described with reference to specific embodiments thereof, and has been demonstrated as effective in providing configurations, methods, and compositions for removing COS from process streams containing it. However, it will be evident that various modifications and changes can be made thereto without departing from the broader scope of the invention as set forth in the appended claims. Accordingly, the specification is to be regarded in an illustrative rather than a restrictive sense. For example, the type of process streams, the amounts and ratios of sodium borohydride, treatment procedures, reaction parameters and other components and/or conditions falling within the claimed parameters, but not specifically identified or tried in a particular method, are expected to be within the scope of this invention. Further, it is expected that the method may change somewhat from one application to another and still accomplish the stated purposes and goals of the methods described herein.

The words "comprising" and "comprises" as used throughout the claims is to be interpreted as "including but not limited to".

The present invention may suitably comprise, consist or consist essentially of the elements disclosed and may be practiced in the absence of an element not disclosed. For instance, there may be provided a method for removing carbonyl sulfide from a process stream containing it, the method consisting essentially of or consisting of contacting the process stream with an amount of sodium borohydride effective to react with the carbonyl sulfide to form at least one reaction product that may be removed by a process selected from the group consisting of washing away the at least one reaction product with a basic compound and/or trapping the at least one reaction product, where the at least one reaction product has a higher boiling point than carbonyl sulfide.

What is claimed is:

1. A method for removing carbonyl sulfide from a process stream containing it, the method comprising contacting the process stream with an amount of sodium borohydride ranging from a molar ratio of sodium borohydride to carbonyl sulfide of from about 0.02:1 to about 50:1 based on the amount of carbonyl sulfide, where the sodium borohydride reacts with the carbonyl sulfide to form at least one reaction product, where the at least one reaction product may be removed from the process stream by a process selected from the group consisting of:
   washing away the at least one reaction product with a basic compound;
   trapping the at least one reaction product, where the at least one reaction product has a higher boiling point than carbonyl sulfide; and
   combinations thereof.

2. The method of claim 1 where:
   the process stream is present in a caustic tower of a petroleum or petrochemical process;
   the basic compound is selected from the group consisting of sodium hydroxide, potassium hydroxide, lithium hydroxide, an amine, and combinations thereof; and
   the at least one reaction product having a higher boiling point than carbonyl sulfide is trapped in the caustic tower.

3. The method of claim 1 where the process stream is present in a process selected from the group consisting of a hydrogen sulfide scrubbing process and an olefins steam cracking process.

4. The method of claim 1 where the amount of sodium borohydride added to the process stream ranges from a molar ratio of sodium borohydride to carbonyl sulfide of from about 0.1:1 to about 40:1 based on the amount of carbonyl sulfide.

5. The method of claim 1 where the amount of sodium borohydride added to the process stream is effective to lower the concentration of COS in the process stream to from about 0.1 independently to about 100 ppm.

6. A method for removing carbonyl sulfide from a process stream containing it, where the process stream is present in a caustic tower of a petroleum or petrochemical process, the method comprising contacting the process stream with an amount of sodium borohydride ranging from a molar ratio of sodium borohydride to carbonyl sulfide of from about 0.02:1 to about 50:1 based on the amount of carbonyl sulfide where the sodium borohydride reacts with the carbonyl sulfide to form at least one reaction product that may be removed by a process selected from the group consisting of:
   washing away the at least one reaction product with a basic compound selected from the group consisting of sodium hydroxide, potassium hydroxide, an amine, and combinations thereof;
   trapping the at least one reaction product in the caustic tower, where the at least one reaction product has a higher boiling point than carbonyl sulfide; and
   combinations thereof.

7. The method of claim 6 where the process stream is present in process selected from the group consisting of a hydrogen sulfide scrubbing process and an olefins steam cracking process.

8. The method of claim 6 where the amount of sodium borohydride added to the process stream ranges from a molar ratio of sodium borohydride to carbonyl sulfide of from about 0.1:1 to about 40:1 based on the amount of carbonyl sulfide.

9. The method of claim 6 where the amount of sodium borohydride added to the process stream is effective to lower the concentration of COS in the process stream to from about 0.1 independently to about 100 ppm.

10. The method of claim 6 where the method comprises washing away the at least one reaction product with a basic compound in an aqueous liquid:
   when the basic compound is an alkali metal hydroxide, the amount of alkali metal hydroxide may be about 20 wt % or less of the liquid; and
   when the basic compound is an amine, the amount of amine may comprise about 50 wt % independently to about 60 wt % of the liquid.

11. A method for removing carbonyl sulfide from a process stream containing it, where the process stream is present in a caustic tower of a petroleum or petrochemical process, the method comprising contacting the process stream with an amount of sodium borohydride ranging from a molar ratio of sodium borohydride to carbonyl sulfide of from about 0.1:1 to about 40:1 based on the amount of carbonyl sulfide where the sodium borohydride reacts with the carbonyl sulfide to form at least one reaction product that may be removed by a process selected from the group consisting of:
   washing away the at least one reaction product with a basic compound selected from the group consisting of sodium hydroxide, potassium hydroxide, an amine, and combinations thereof;
   trapping the at least one reaction product in the caustic tower, where the at least one reaction product has a higher boiling point than carbonyl sulfide; and
   combinations thereof;
where the process stream is present in process selected from the group consisting of a hydrogen sulfide scrubbing process and an olefins steam cracking process.

12. The method of claim 11 where the amount of sodium borohydride added to the process stream is effective to lower the concentration of COS in the process stream to from about 0.1 independently to about 100 ppm.

13. The method of claim 11 where the method comprises washing away the at least one reaction product with a basic compound in an aqueous liquid:
when the basic compound is an alkali metal hydroxide, the amount of alkali metal hydroxide may be about 20 wt % or less of the liquid; and
when the basic compound is an amine, the amount of amine may comprise about 50 wt % independently to about 60 wt % of the liquid.

\* \* \* \* \*